United States Patent
Kawamura et al.

(10) Patent No.: US 6,631,029 B2
(45) Date of Patent: Oct. 7, 2003

(54) OPTICAL IMAGE SEPARATION SYSTEM AND CONFOCAL SCANNING UNIT

(75) Inventors: Shinichirou Kawamura, Tokyo (JP); Hideomi Negishi, Tokyo (JP); Nobuhiro Tomosada, Tokyo (JP); Shinya Ootsuki, Tokyo (JP); Jafer Shelbee, Sunderland (GB); Kenneth Bell, Sunderland (GB)

(73) Assignees: Yokogawa Electric Corporation, Tokyo (JP); Visitech International, Ltd., Sudarland (GB)

( * ) Notice: Subject to any disclaimer, the term of this patent is extended or adjusted under 35 U.S.C. 154(b) by 298 days.

(21) Appl. No.: 09/800,333

(22) Filed: Mar. 5, 2001

(65) Prior Publication Data

US 2001/0054676 A1 Dec. 27, 2001

(30) Foreign Application Priority Data

Jun. 23, 2000 (GB) .............................. 0015412

(51) Int. Cl.[7] ............................ G02B 21/06; G02B 21/18
(52) U.S. Cl. ........................................ 359/368; 359/234
(58) Field of Search ............................ 250/208.1, 216; 359/227, 234, 235, 368, 385, 388

(56) References Cited

U.S. PATENT DOCUMENTS

| 5,717,519 A | * | 2/1998 | Sugiyama et al. | .......... 359/368 |
| 5,969,846 A | * | 10/1999 | Kishi | .......... 359/227 |
| 6,297,904 B1 | * | 10/2001 | Kitigawa et al. | .......... 359/368 |
| 6,426,835 B1 | * | 7/2002 | Endo et al. | .......... 359/388 |

\* cited by examiner

*Primary Examiner*—Gerard R. Strecker
(74) *Attorney, Agent, or Firm*—Moonray Kojima

(57) ABSTRACT

An optical image separation system, connected to a confocal image output port of a Nipkow disk type confocal scanner, wherein light returned from a sample and emitted from the confocal image output port is separated into a plurality of different wavelen regions, respectively, so that a plurality of samples emitting different wavelenghts are concurrently detected.

9 Claims, 8 Drawing Sheets

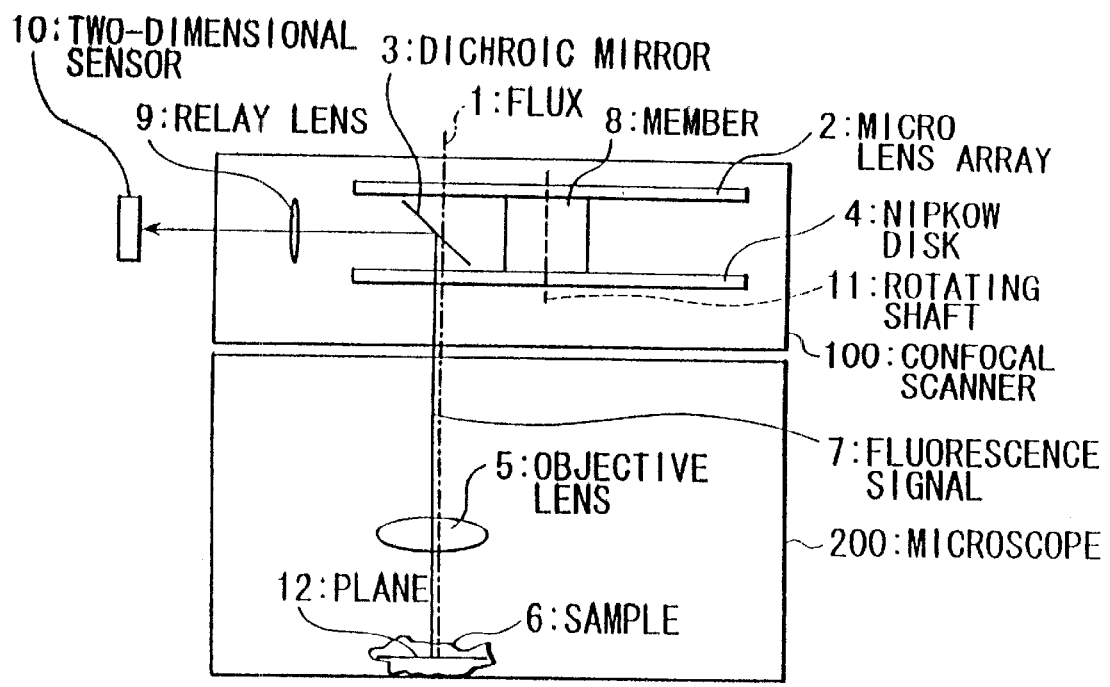
FIG. 1 [PRIOR ART]

FIG. 2 [PRIOR ART]
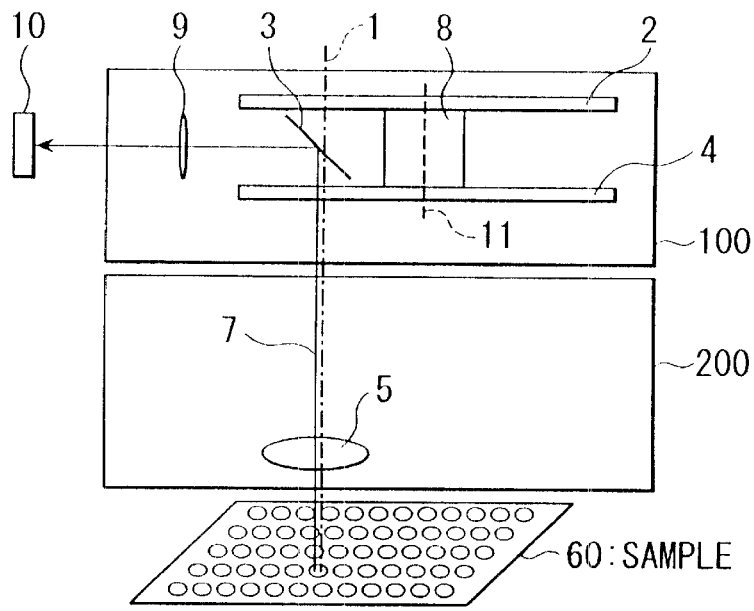
FIG. 3 [PRIOR ART]
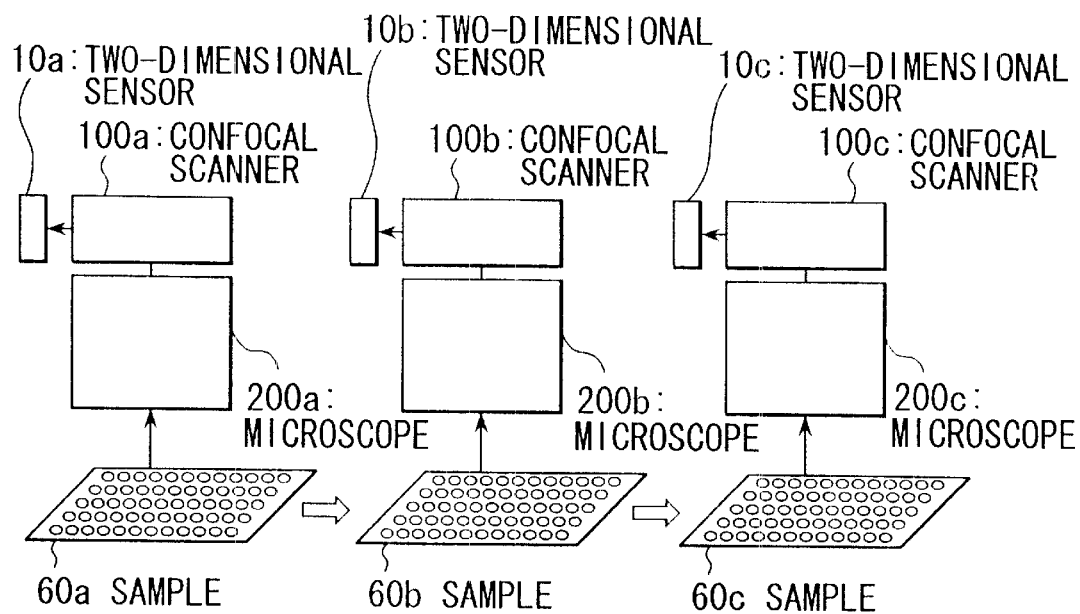

OPTICAL IMAGE SEPARATION SYSTEM AND CONFOCAL SCANNING UNIT

BACKGROUND OF THE INVENTION

1. Field of Invention

This invention relates to a confocal observation system; and more particularly, to an optical image separation system connected to a confocal image output port of a Nipkow disk type confocal scanner.

2. Description of the Prior Art

FIG. 1 shows a conventional Nipkow disk type confocal scanner used with a microscope, wherein confocal scanner 100 is connected to microscope 200. Illuminating parallel excitation light beam 1 (depicted as a chain line) is converged into individual beams by micro lens array disk (called "ML disk") 2, and passed through pinholes of pinhole array disk (called "Nipkow disk") 4 after being transmitted through dichroic mirror (called "DM") 3. Light beam 1 is then focused onto sample 6 by objective lens 5 of the microscope 200. Fluorescence signal 7 (depicted as a continuous line) emitted from sample 6 is transmitted through objective lens 5 and is focused on the pinholes of Nipkow disk 4. Fluorescence signal 7, passed through the pinholes, is reflected by DM 3 and is caused to form a fluorescence image on a two dimensional sensor 10 by relay lens 9. DM 3 is designed to transmit excitation light 1 and to reflect the desired fluorescence signal 7.

ML disk 2, and Nipkow disk 4 are concurrently turned by rotation shaft 11, both being mechanically connected to each other by member 8. Mico lenses and pinholes formed on Nipkow disk 4 are arranged so that the pinholes scan over plane 12 to observe sample 6. The plane on which pinholes of Nipkow disk 4 are arranged, plane 12 to be observed on sample 6, and light detecting surface of the sensor 10 are arranged in optically conjugate relationship to each other. Accordingly, an optical sectional image of sample 6, that is, a confocal image is formed on sensor 10.

A plurality of specimens placed on the same plane can be simultaneously observed because a Nipkow disk type confocal scanner uses a two dimensional sensor. Also, a confocal image of sample 6 can be formed on the light detecting surface of the sensor 10 in a short time by rotating ML disk 2 and Nipkow disk 4 together at a high speed. This makes it possible to acquire at high speeds confocal images of all of the samples 60, on which many specimens to be inspected are arranged in a matrix as shown in FIG. 2, moving them relative to the microscope and the confocal scanner. Accordingly, confocal scanners are used for screening procedures used in developing new medicine. Furthermore, when a sample emitting sufficiently bright fluorescence signals is used as the object of test or inspection, use of the ML disk 2 is sometimes not necessary.

The conventional confocal scanner has a problem in that the number of samples that can be processed per unit time in the screening procedure of FIG. 2, is limited to those where a sample emits only one type of fluorescence. Disadvantageously, when a multiple staining procedure is used, a plurality of different fluorescence wavelengths, depending on sample reactions to the different wavelengths, are detected. This is done by adding separate fluorescence reagents having different wavelengths of fluorescence for each sample 60, or by adding a plurality of types of fluorescence reagents to all of the samples. In that case, sample 60 having a plurality of different specimen reacting to different fluorescence reagents, is first inspected using a DM 3 that has a specific reflection characteristic and can detect that specific first fluorescence wavelength. Then, after replacing the DM3 with another DM3 having another reflection characteristic corresponding to the second fluorescence wavelength, the entire specimen having the plurality of samples, must again be inspected. As can be appreciated, the conventional confocal scanner can be improved.

As shown in FIG. 3, one way of handling the foregoing problem is to use a plurality of sets of microscopes 200a, 200b, 200c; confocal scanners 100a, 100b, 100c; and two dimensional sensors 10a, 10b, 10c, arranged, respectively, for each fluorescence wavelength. When inspection for fluorescence wavelength λn to sample 60n is completed for one wavelength, sample 60n is sent to the next inspections system n+1 comprising microscope 200n+1, scanner 100n+1 and two dimensional sensor 10n+1, and then the process is repeated for the next fluorescence wavelength of the sample. In other words, the inspection for each fluorescence wavelength is repeated using the different sets. However, this arrangement is not satisfactory since it involves use of a plurality of sets of devices and hence cost is expensive, and repeated procedures are time consuming.

SUMMARY OF THE INVENTION

Accordingly, an object of the invention is to overcome the aforementioned and other deficiencies, disadvantages and problems of the prior art.

Another object is to provide an optical image separation system connected to a Nipkow disk type confocal scanner, wherein return light from a sample is detected by separating the return light concurrently into a plurality of different wavelength regions without repeating the DM changes, as done in the prior art; and inspection of the total number of specimen by using the entire number of wavelengths, without using a plurality of sets of scanners and microscopes, as done in the prior art.

The foregoing and other objects are attained in the invention which encompasses an optical image separation system connected to a confocal image output port of a Nipkow disk type confocal scanner, wherein the optical image separation system comprises a return light separating means that separates the light returned from a sample and emitted from the output port of the scanner into light beams of a plurality of wavelength regions or a plurality of portions of the same wavelength region.

The various features, aspects, and advantages and effects of the invention are further detailed hereinbelow.

BRIEF DESCRIPTION OF THE DRAWINGS

FIG. 1 is a schematic view depicting a conventional confocal scanner used with a microscope.

FIG. 2 is a schematic view depicting another conventional confocal scanner used with a microscope and scanning a plurality of samples.

FIG. 3 is a schematic view depicting a conventional screening method using a plurality of confocal scanners and microscopes.

DETAILED DESCRIPTION OF THE PREFERRED EMBODIMENTS

First Illustrative Embodiment

Figure 4:
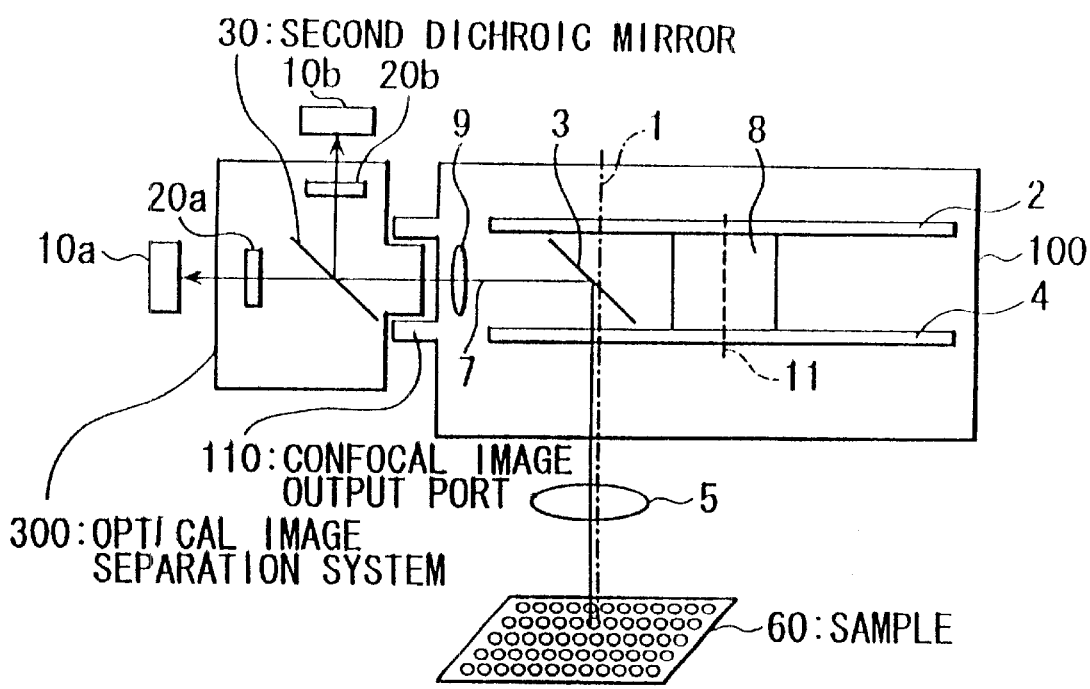
FIG. 4 is a schematic view depicting a first illustrative embodiment of the invention.
Figure 5:
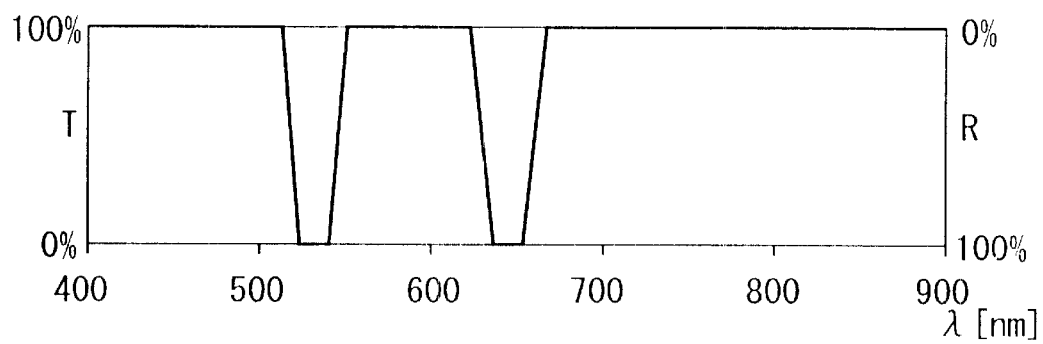
FIG. 5 is a graph depicting spectral response of the dichroic mirror of the confocal scanner 100 of FIG. 4.

FIG. 4 shows a first illustrative embodiment of the invention, wherein the same components as those in FIG. 1 are provided the same symbols and are not further described hereat. Confocal scanner 100 is connected to a microscope (which for sake of clarity in description is omitted hereat, it being understood that such microscope is contained in the drawings). Illuminating parallel excitation flux 1 (shown by a chain line) containing a first fluorescence wavelength $\lambda 1=532$ nm and a second fluorescence wavelength $\lambda 2=647$ nm, is converged into individual fluxes by ML disk 2. The fluxes pass through the pinholes of Nipkow disk 4 after traveling through first DM 3, comprising a flat plate mirror having the spectral response shown in FIG. 5, and are focused onto each specimen of sample 60 by objective lens 5 of the microscope to excite the fluorescence reagent therein. Objective lens 5 may comprise a converging lens, not shown, to construct an infinite optical system. Optical image separation system 300 is connected to confocal image output port 110 of confocal scanner 100. The separation system 300 is provided with a second DM 30, comprising a flat plate mirror, which is used as a return light separating means, and barrier filters 20a, 20b, having the spectral response shown in FIG. 7, which are used to remove stray light, that is serve as a stray light removing means.

Each specimen of sample 60 has added thereto fluorescence reagent CY3 and CY5. Fluorescence signal 7, shown by a straight line, emitted by each fluorescence reagent, is passed through objective lens 5, and is then focused on the pinholes of Nipkow disk 4; then, is reflected by DM 3; and then is emitted from output port 110 of confocal scanner 100, via relay lens 9, so that each image is formed on two dimensional sensor 10a, 10b, which sensor acts as a detecting means.

Figure 6:
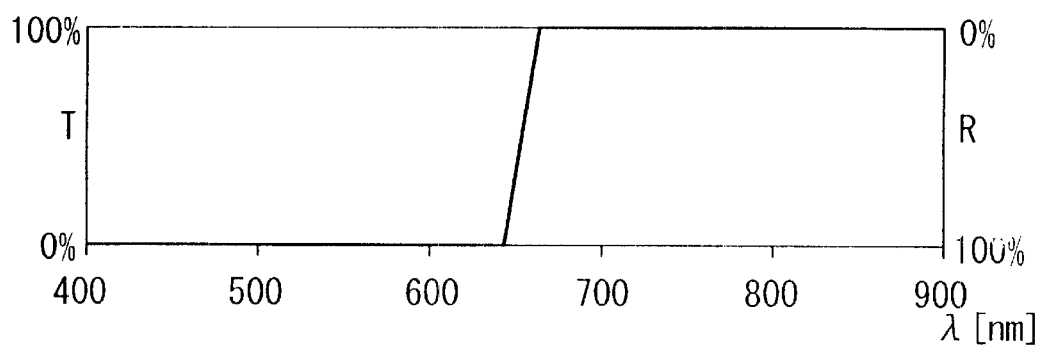
FIG. 6 is a graph depicting spectral response of the dichroic mirrof of the optical image separation system 300 of FIG. 4.

The separation system 300 is connected to port 110. Fluorescence signal 7, reflected by DM 3, reaches second DM 30, which has the spectral response shown in FIG. 6. Signal 7, having wavelengths 660 nm to 720 nm of CY5 fluorescent components, is transmitted through DM 30 and reaches the sensor 10a after passing through barrier filter 20a, having the spectral response shown in FIG. 7, while signal 7, having wavelengths 550 nm to 630 nm of CY fluorescent component, is reflected by DM 30 and reaches sensor 10b after passing through barrier filter 20b, having the spectral response shown in FIG. 7. The confocal optical image formed on Nipkow disk 4 is caused to be formed on the two dimensional sensors 10a, and 10b, by relay lens 9.

In the embodiment of FIG. 4, an optical sectional image of sample 60, that is, a confocal image is formed on two dimensional sensors 10a and 10b because the following planes are arranged in an optically conjugate relationship to each other: (1) the plane on which the pinholes of the Nipkow disk 4 are arranged; (2) the plane on sample 60 to be observed; and (3) the plane of light detecting surface of two dimensional sensors 10a or 10b. Since the confocal image of sample 60 can be formed simultaneously on the light detecting surfaces of sensors 10a, 10b, confocal images that are selected and separated for any wavelength for all of the specimen cna be acquired at high speeds by moving sample 60, on which a number of specimen to be inspected are arranged in a matrix, relative to the microscope and confocal scanner. When the objects of inspection are specimen emitting sufficiently bright fluorescence signals, ML disk 2 may be omitted.

Figure 7:
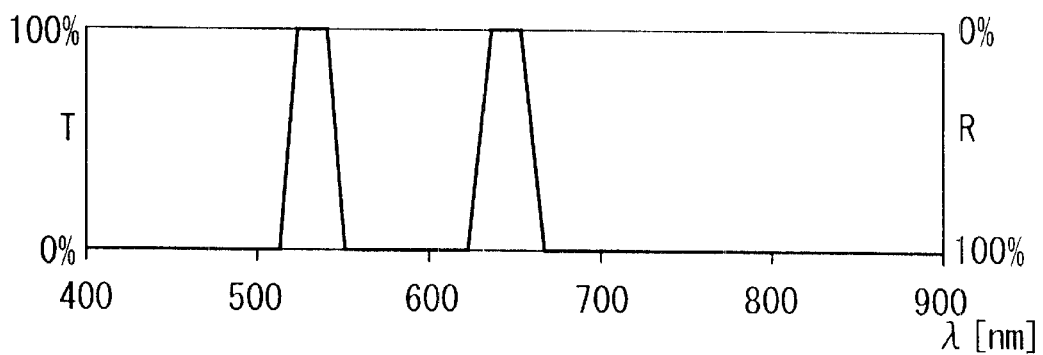
FIG. 7 is a graph depicting spectral response of the barrier filters 20a, 20b of FIG. 4.

In addition, barrier filters 20a, 20b, having the spectral response shown in FIG. 7, are used to prevent excitation stray light from reaching the sensors 10a, 10b. The stray light will generally be mixed with the fluorescence signal. However, when the fluorescence signal is sufficiently larger than the excitation stray light signals, the barrier filters 20a, 20b, may be omitted.

The fluorescent reagents used in the invention are not limited to CY3 and CY5. Any suitable fluorescent reagent may be used by providing DMs that have the spectral response suitable for the wavelengths corresponding to the reagents. The fluorescent pigments (excitation wavelength peak [nm]/fluorescence wavelength peak [nm]) are listed below as examples. In addition, instead of adding fluorescent reagents, techniques may be used which integrate proteins that emit specific fluorescence respectively to be expressed with gene manipulations. Examples of fluorescence reagent usable in the invention are: BODYPY-FL (503/512); FITC (494/520); R-phycoerythrin (480/578); GFP (Green fluorescent Protein) (488/509); YOYO-1 (491/509); TOTO-1 (514/533); Ethidium Bromide (510/595); Propidium Iodide (494 or 536/617); Acridine Orange (487/526 or 650); Rhodamine 123 (505/534); DiO(484/505); DiA (491/595);Di-8=ANEPPS (498/680); DiOC5.6.7(478/500 to 510); BCECF (490/530); Fluo-3 (506/526); Calcium Green (506/533); Fura red (480 to 500/640 or 425 to 450); Fura red and Fluo-3 (503/526 or 640); Magnesium Green 506/532).

Second Illustrative Embodiment

Figure 8:
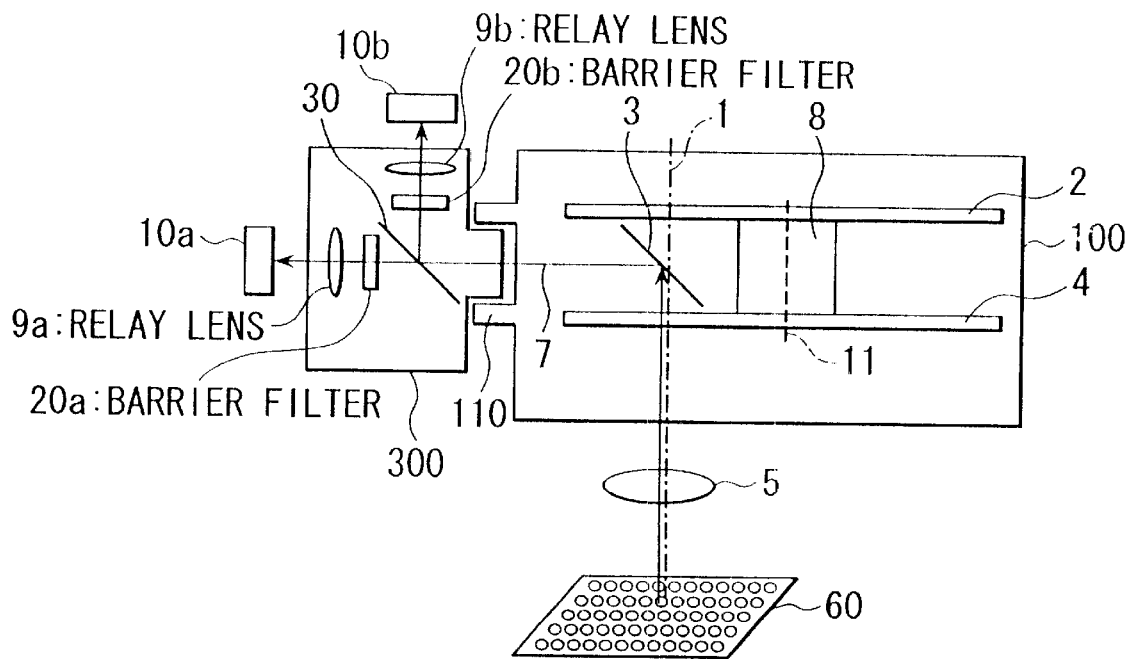
FIG. 8 is a schematic view depicting a second illustrative embodiment of the invention.

FIG. 8 shows a second illustrative embodiment, wherein the same components as those of FIG. 4 are provided the same symbols and are not discussed hereat for sake of clarity. The FIG. 8 embodiment improves the aberration in the barrier filters 20a and 20b and the degree of positional freedom of the sensors 10a, 10b on each optical axis by positioning relay lenses 9a and 9b of the image forming optical system, between DM 30 and the sensors 10a, 10b, respectively. Relay lenses 9a, 9b may have different shapes and focal lengths.

Third Illustrative Embodiment

Figure 9:
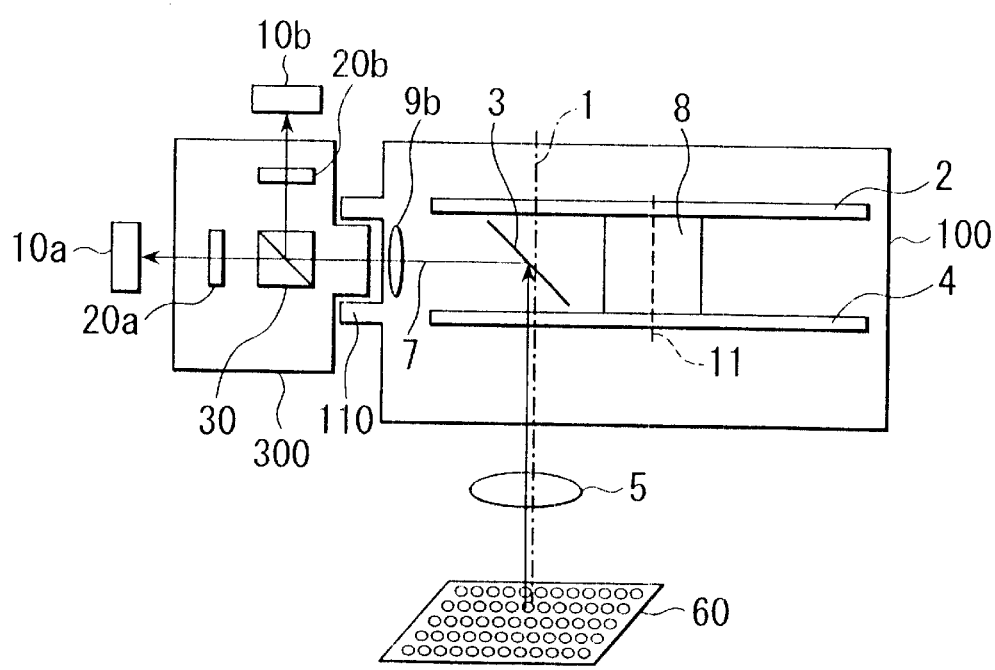
FIG. 9 is a schematic view depicting a third illustrative embodiment of the invention.

FIG. 9 shows a third illustrative embodiment wherein the same components as those in FIG. 4 are given the same symbols and overlapping descriptions are omitted. The FIG. 9 embodiment uses a prism mirror as the second DM 30. The prism has the advantage of easier handling characteristics as compared to the flat plate mirror.

Fourth Illustrative Embodiment

Figure 10:
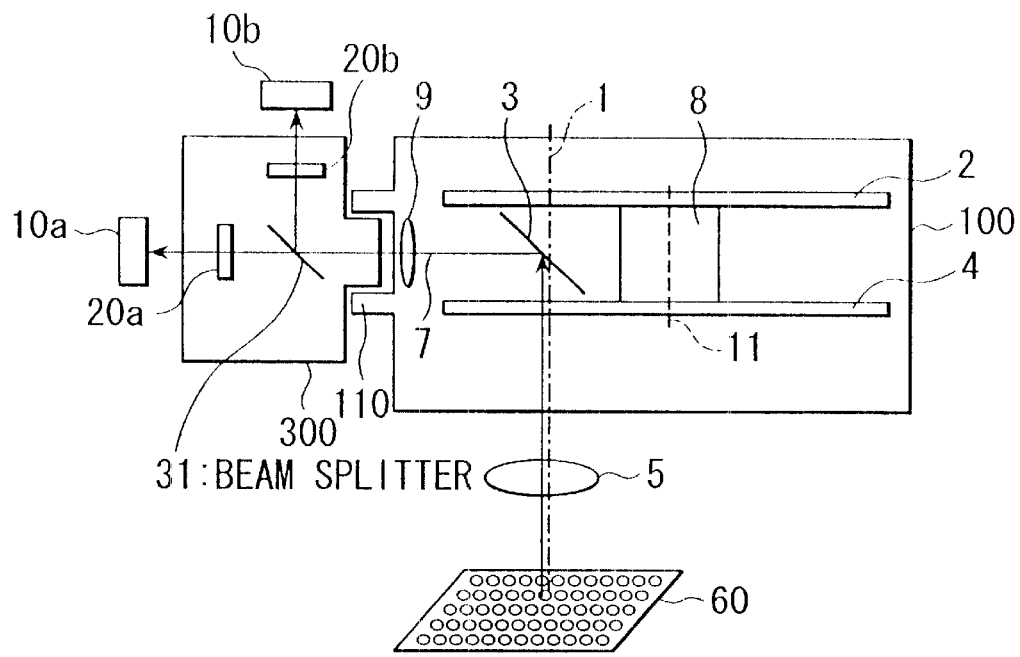
FIG. 10 is a schematic view depicting a fourth illustrative embodiment of the invention.

FIG. 10 shows a fourth illustrative embodiment wherein the same components as those shown in FIG. 4 are provided the same symbols and are not discussed further hereat for sake of clarity. The FIG. 10 embodiment uses a beam splitter 31 (as the second DM 30 in the prior embodiments) comprising a flat plate glass or prism and having a partial transmission characteristic without having a wavelength separation characteristic. Fluorescence signals split by beam splitter 31 have the same fluorescent spectrum; and images, in which resolution, sensitivity, and angle of view are varied, are acquired simultaneously on the sensors 10a and 10b. Although partial transmittance is mainly used with a ratio of 50:50 in many cases, flat plate glass can be used as beam splitter 31 with any partial transmittance not being limited to this range.

Fifth Illustrative Embodiment

Figure 11:
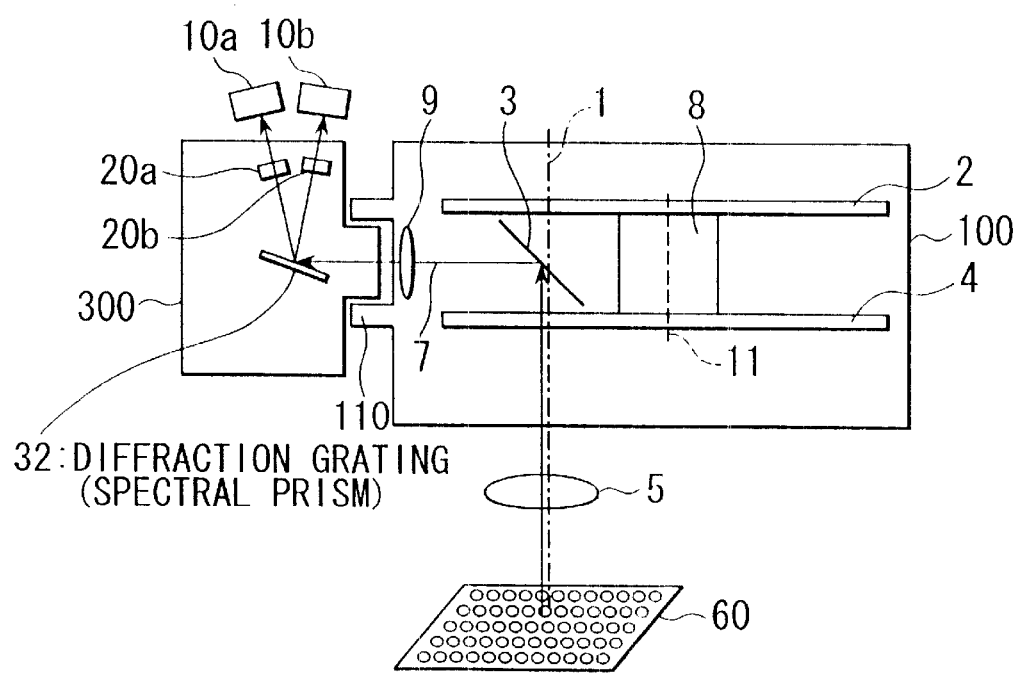
FIG. 11 is a schematic view depicting a fifth illustrative embodiment of the invention.

FIG. 11 shows a fifth illustrative embodiment, wherein the same components as those of FIG. 4 are provided the same symbols, and overlapping description is omitted hereat. The FIG. 11 embodiment shows a diffraction grating or spectral prism 32 (as the second DM 30 in the prior embodiments) having a wavelength separation characteristic. Advantageously, the FIG. 11 embodiment can be used to select any wavelength by changing the angle of incidence of the fluorescence signal 7 to diffraction grating or spectral prism 32.

Sixth Illustrative Embodiment

Figure 12:
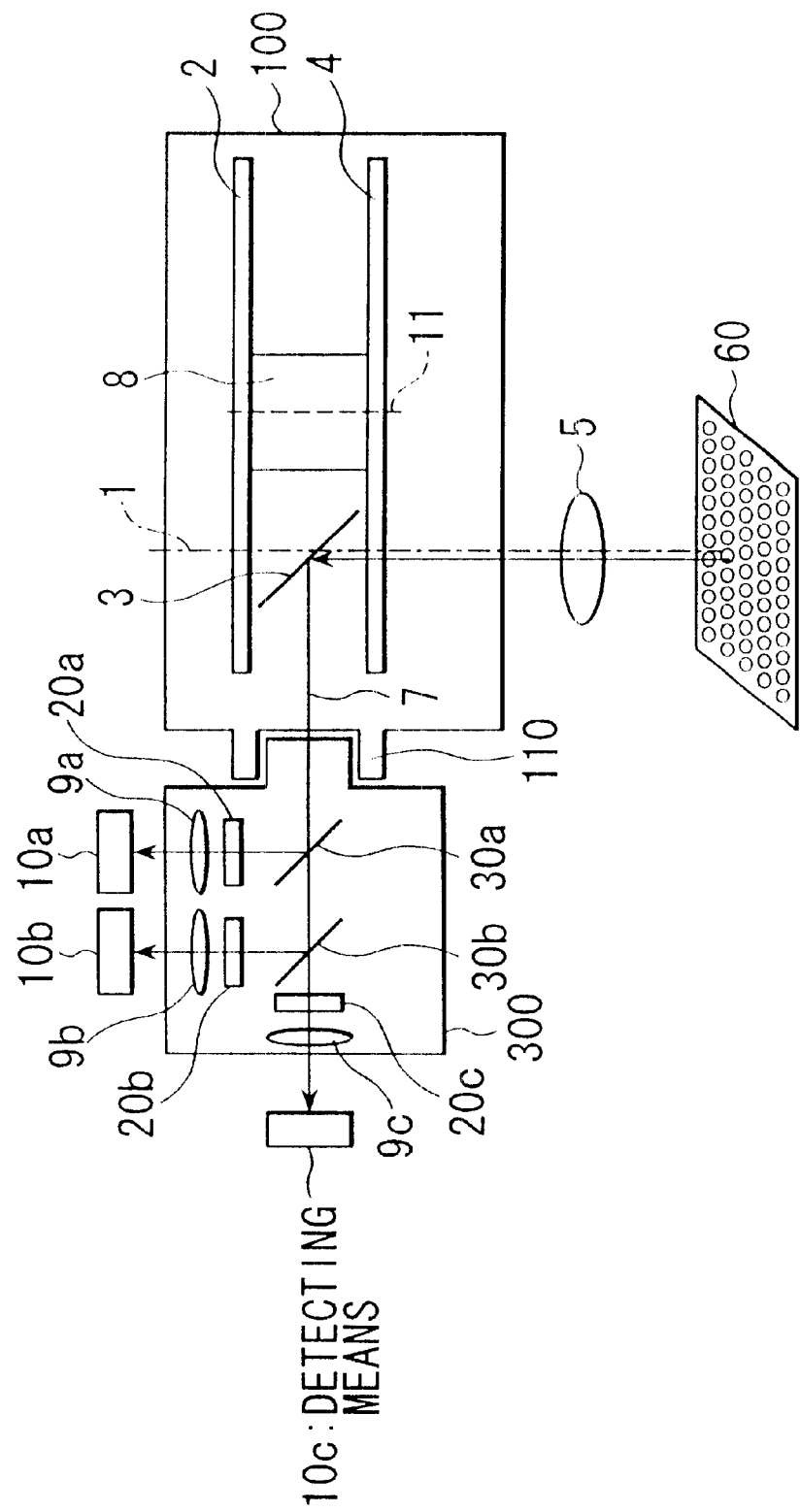
FIG. 12 is a schematic view depicting a sixth illustrative embodiment of the invention.

FIG. 12 shows a sixth illustrative embodiment, wherein the same components as those of FIG. 4 are provided the same symbols and description thereof is omitted. The FIG. 12 embodiment uses in the separation system 300 an added second DM 30a, 30b; an added relay lens 9a, 9b; an added barrier filter 20a, 20b, 20c, and an added sensor 10a, 10b, arranged so that the confocal fluorescence images have the respective wavelengths separated into three by the sensors and are acquired simultaneously.

Seventh Illustrative Embodiment

Figure 13:
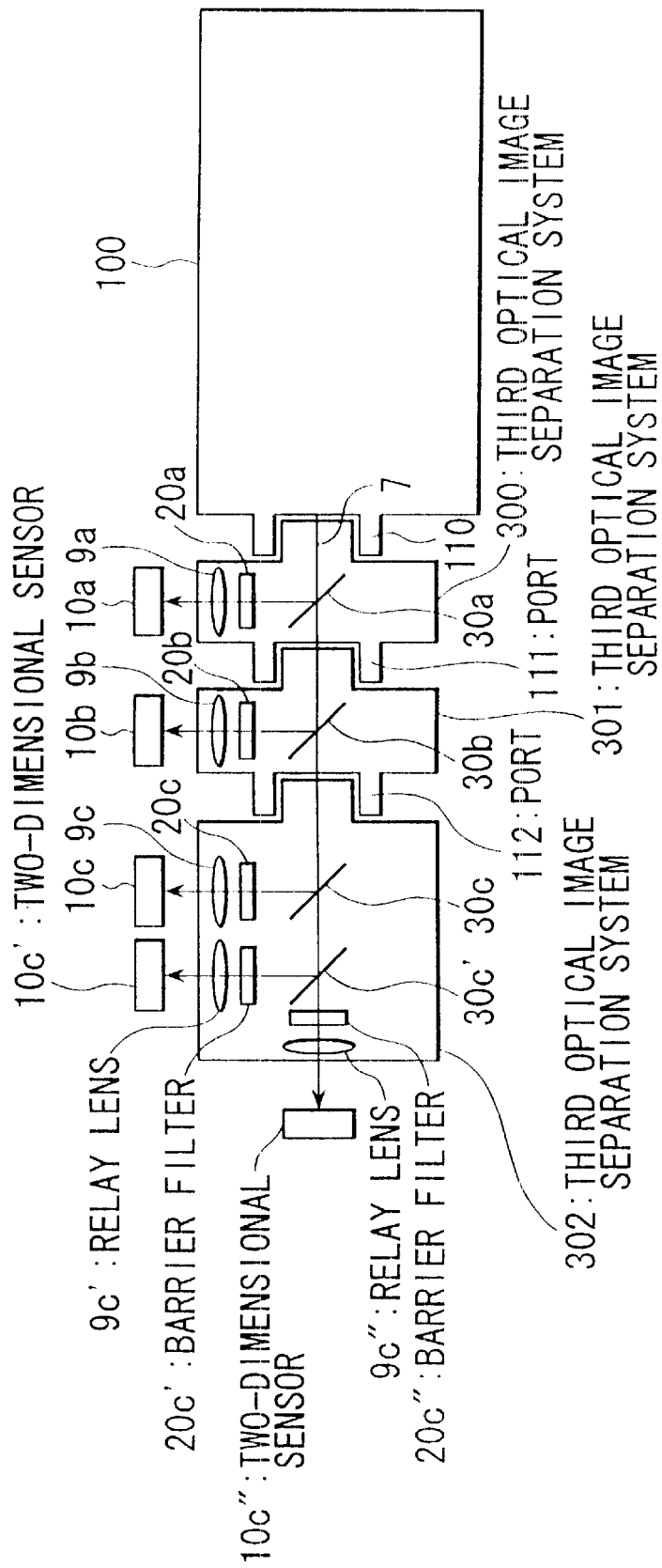
FIG. 13 is a schematic view depicting a seventh illustrative embodiment of the invention.

FIG. 13 shows a seventh illustrative embodiment, wherein the same components as those in FIG. 4 are provided the same symbols and description thereof is omitted. The FIG. 13 embodiment uses two added optical image separation systems 301, 302. The first, second and third optical image separation systems 300, 301, 302 are concatenated with each other via ports 111 and 112 and the systems are serially connected to confocal image output port 110 of scanner 100, as depicted.

First, wavelength component λa is separate from confocal fluorescence signal 7, emitted from confocal image output port 110 of the scanner 100, by DM 30a disposed in first system 300. The excitation stray light component is removed by barrier filter 20a. Then, an image is formed on sensor 10a by relay lens 9a. Second, wavelength component λb is separated from the fluorescence signal component that is transmitted through DM 30a by DM 30b disposed in second separation system 301. The excitation stray light component is removed by barrier filter 20b. Then, another image is formed on sensor 10b by relay 9b. Third, wavelength component λc is separated from the fluorescence signal component that is transmitted through DM 30b by DM 30c disposed in third separation system 302. The excitation stray light component is removed by barrier filter 20c. Then, the third image is formed on sensor 10c by relay lens 9c. In a similar manner, wavelength component λc' of fluorescence signal component that is transmitted through DM 30c is separated by DM 30c' disposed in the third separation system 302. The image thereof is formed on sensor 10c' by relay lens 9c' after the excitation stray light component is removed by barrier filter 20c'. An image of all the fluorescence signal components that have been transmitted through DM 30c' is formed on sensor 10c" by relay lens 9c" after the excitation stray light component is removed by barrier filter 20c" disposed in third separation system 302.

As shown in the FIG. 13 embodiment, wavelength separation for a fluorescence wavelength component can be easily carried out and confocal images of different wavelength components are simultaneously observed by concatenating optical image separation systems, wherein each system is provided with a DM or DMs having a characteristic to separate a wavelength component as desired, and by connecting the separation systems to a confocal image output port of a confocal scanner. In addition, with the invention, it is easy to freely change the layout of the system by changing optical paths, for example, by using fold back mirrors.

According to the invention, light returned from a sample and emitted from a confocal image output port of a confocal scanner can be separated into a plurality of light beams of a plurality of wavelength regions or to a plurality of portions of the same wavelength region. Hence, a confocal image for each arbitrary separated wavelength region or any portion of the same wavelength region can be acquired simultaneously and at high speeds and without deterioration of the resolution so that repeated replacement of the DM and inspection of the total number of specimen by the required wavelength without use of a plurality of scanners and microscopes, as required by the prior art, are eliminated. Accordingly, greater reliability and economy are attained by the invention. Also, the invention separation system can be easily changed to handle a plurality of wavelength regions or a plurality of portions of the same wavelength region requiring separation.

One aspect of the invention comprises a confocal scanner comprising a Nipkow disk, a dichroic mirror, and an output port, said scanner scanning a sample and outputting a light from a sample through the Nikow disk, the dichroic mirror and the output port; a plurality of two dimensional sensors; and means for receiving the light from the output port and for separating the light into a plurality of light beams each having a particular wavelength, and for transmitting the plurality of light beams to each of the plurality of sensors so as to produce a plurality of optical images of the different specimen in the sample concurrently, reliably, and economically.

In other aspects of the invention, the means for separating the light into different light beams can be a flat plate mirror, a prism, a beam splitter, a diffraction grating, and/or a spectral prism.

Another aspect of the invention is that the light from the sample is a fluorescent light having a plurality of wavelengths, or ranges of wavelengths, one for each specimen in the sample. The fluorescence light may be caused by using a fluorescent reagent, such as CY3 or CY5, or any of the other reagents listed priorly.

A further aspect of the invention is use of one or more filtering means to filter stray light from being inputted to the sensor, and furthermore, disposition of the filtering means, which can be a barrier filter, before the separated light is inputted to the sensor.

Another aspect of the invention is the use of relay lenses to focus the light appropriately, such relay lenses being disposed adjacent the output port of the scanner, and/or before the sensors.

In yet another aspect of the invention, three sensors are used together with three relay lenses, and three barrier lenses, whereby three sets of different wavelengths or wavelength ranges are separated to produce three images.

Another aspect of the invention is to serially connect a plurality of separation units to the output port of the scanner, with each separation unit comprising a dichroic mirror, a barrier filter, and a relay lens, and having an associated sensor to which the separated light beam is directed to produce an image.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An optical image separation system comprising:

a confocal scanner unit comprising a Nipkow disk, a dichroic mirror and an output port, said output port comprising a structure having a hole defined by a lip of a first dimension, said scanner unit scanning a sample outside of said scanner unit and receiving a light from said sample through said Nipkow disk, said dichroic mirror and said hole of said output port structure;

a plurality of sensors disposed outside of said scanner unit; and at least one separable means disposed outside of said scanner unit and between said scanner unit and said plurality of sensors, said at least one separable means comprising a structure having a hole defined by a lip of a second dimension which is smaller than said first dimension so as to fit within said lip of said scanner unit output port structure in an attached condition, said at least one separable means receiving light transmitted through said hole of said scanner unit structure and through said hole of said at least one separable means, said at least one separable means further comprising:

means for separating said light into a plurality of light paths each having a particular wave length, and means for transmitting said plurality of light paths respectively to each of said plurality of sensors; whereby a plurality of optical images of different specimen in said sample are concurrently produced; and whereby said at least one separable means is readily attachable and detachable from said scanner unit.

2. The system of claim 1, wherein said at least one separable means comprises a plurality of separable means with each being respectively attachable and detachable from one another.

3. The system of claim 1, wherein said at least one separable means comprises a barrier filter for each light path.

4. The system of claim 1, wherein said at least one separable means comprises a relay lens in each light path.

5. The system of claim 3, wherein said at least one separable means comprises a relay lens for each light path.

6. The system of claim 5, wherein said relay lens is disposed between said barrier filter and said hole of said output path structure.

7. The system of claim 5, wherein said barrier filter is disposed between said relay lens and said hole of said output path structure.

8. The system of claim 1, wherein said sample is exposed to a fluorescent agent.

9. The system of claim 1, wherein said means for separating one of the following devices: a flat plate mirror, beam splitter, a diffraction grating, a prism, and a spectral prism.

* * * * *